United States Patent
Matsuumi

(10) Patent No.: US 8,263,188 B2
(45) Date of Patent: *Sep. 11, 2012

(54) COMPOSITION FOR PHOTO-ALIGNMENT FILM, PHOTO-ALIGNMENT FILM AND METHOD FOR PRODUCING THE SAME, LIQUID CRYSTAL CELL, AND LIQUID CRYSTAL DISPLAY

(75) Inventor: Michitaka Matsuumi, Kanagawa (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 524 days.

This patent is subject to a terminal disclaimer.

(21) Appl. No.: 12/407,388

(22) Filed: Mar. 19, 2009

(65) Prior Publication Data

US 2009/0246401 A1 Oct. 1, 2009

(30) Foreign Application Priority Data

Mar. 31, 2008 (JP) ................................. 2008-093388

(51) Int. Cl.
- *B05D 3/00* (2006.01)
- *B29C 71/02* (2006.01)
- *B29C 71/04* (2006.01)
- *C04B 41/00* (2006.01)
- *C08J 7/18* (2006.01)
- *F21V 9/00* (2006.01)
- *G02B 5/02* (2006.01)
- *G02C 7/10* (2006.01)
- *G02F 1/361* (2006.01)
- *G03B 11/00* (2006.01)
- *C09K 19/52* (2006.01)

(52) U.S. Cl. ............. 427/532; 252/182.31; 252/299.01; 252/299.61; 252/299.62; 252/582; 349/123; 427/541; 427/553; 430/20; 524/606; 524/612

(58) Field of Classification Search ............. 252/582, 252/182.31, 299.01, 299.61, 299.62; 349/123; 427/487, 532, 541, 553; 430/20; 524/606, 524/612; 525/326.2, 328.4; 534/577; 560/60
See application file for complete search history.

(56) References Cited

U.S. PATENT DOCUMENTS

2009/0286005 A1 * 11/2009 Oki et al. ..................... 427/541

FOREIGN PATENT DOCUMENTS

| JP | 11-160708 | * | 6/1999 |
| JP | 2990270 B2 | | 12/1999 |
| JP | 2007-121721 A | | 5/2007 |

* cited by examiner

*Primary Examiner* — Bijan Ahvazi
(74) *Attorney, Agent, or Firm* — Buchanan Ingersoll & Rooney PC

(57) ABSTRACT

Provided is a composition for a photo-alignment film includes a compound expressed by the following general formula (I) and a compound expressed by the following general formula (II):

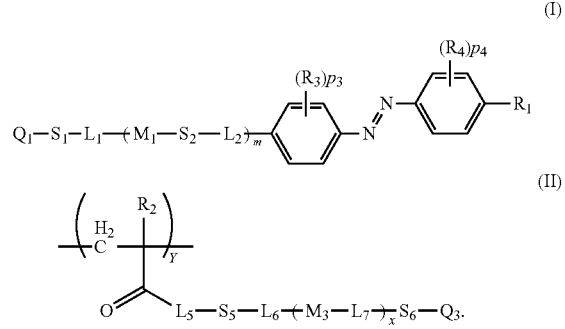

9 Claims, No Drawings

COMPOSITION FOR PHOTO-ALIGNMENT FILM, PHOTO-ALIGNMENT FILM AND METHOD FOR PRODUCING THE SAME, LIQUID CRYSTAL CELL, AND LIQUID CRYSTAL DISPLAY

BACKGROUND OF THE INVENTION

1. Field of the Invention

The present invention relates to a composition for a photo-alignment film, a photo-alignment film and a method for producing the same, a liquid crystal cell, and a liquid crystal display that have an excellent resistance to light etc., and allow imparting alignment controllability for liquid crystal molecules with a small light irradiation dose.

2. Description of the Related Art

Methods for aligning liquid crystals have been used for producing alignment films and the like for liquid crystal displays.

As the methods for aligning liquid crystals, known are methods for chemically or physically treating the surfaces of supports, and among these, well known is a rubbing method, in which the surface of a support is coated with a polymeric resin film of polyimide or the like to be an alignment film, and the alignment film is unilaterally rubbed with cloth or the like. The rubbing method allows obtaining a homogeneous alignment of liquid crystals aligned parallel to the surface of a support as well as unilaterally and uniformly.

However, the rubbing method has problems in that static electricity and dust are generated by rubbing of the alignment film to lower the yield and that it is difficult to quantitatively perform alignment control.

A photo-alignment film process has gained attention as a method that can solve the problems of the rubbing method, in which a photo-alignment film to be imparted with liquid crystal alignment controllability is imparted by irradiation of light is provided on the surface of a support, and the photo-alignment film is irradiated with light to align liquid crystals. As the photo-alignment film process, there is, for example, a report on a technique for using, in the form of a photo-alignment film, a compound, such as an azobenzene derivative, that causes an isomerization reaction through the action of light (see Japanese Patent (JP-B) No. 2990270).

However, the technique described in JP-B No. 2990270 has had such a problem that liquid crystal alignment controllability deteriorates in the course of exposure of the photo-alignment film to light because of a low light resistance of the photo-alignment film, and the production cost is high because a large irradiation dose of light is necessary for causing an isomerization reaction.

There is also a report on, as the photo-alignment film process, a technique for using a composition for a photo-alignment film containing an azo monomer and an amino resin for production of a photo-alignment film (see Japanese Patent Application Laid-Open (JP-A) No. 2007-121721). The technique described in JP-A No. 2007-121721 (Patent Document 2) allows producing a photo-alignment film excellent in resistance with a small light irradiation dose. However, even by the technique described in JP-A No. 2007-121721, reduction in the light irradiation dose is still insufficient, and a photo-alignment film that can be produced with a low irradiation dose of light from the standpoint of production cost etc., while an excellent resistance is maintained has been demanded.

Accordingly, a satisfactory photo-alignment film and a satisfactory method for producing the same that have an excellent resistance to light etc., and allow imparting alignment controllability for liquid crystal molecules with a small light irradiation dose have not yet been provided under the present circumstances.

BRIEF SUMMARY OF THE INVENTION

The present invention aims to solve the problems that have conventionally existed and achieve the following object. That is, it is an object of the present invention to provide a composition for a photo-alignment film, a photo-alignment film and a method for producing the same, a liquid crystal cell, and a liquid crystal display that have an excellent resistance to light etc., and allow imparting alignment controllability for liquid crystal molecules with a small light irradiation dose.

The means for solving the above-mentioned problems are as follows.

<1> A composition for a photo-alignment film containing: a compound expressed by the following general formula (I); and a compound expressed by the following general formula (II):

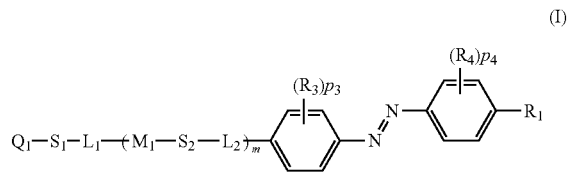

(I)

where in the above general formula (I), $R_1$ is any of a hydrogen atom, a cyano group, —F, —Cl, —Br, an alkyl group, an alkoxy group, —N(CH$_3$)$_2$, an alkylester group, and a group expressed by the following general formula (1), $L_1$ and $L_2$ are identical to or different from each other and are each independently any one selected from the group consisting of a single bond, —O—, —O—CO—, —O—CO—O—, —CO—O—, —S—, —N(CH$_3$)—, —NH—, —N(CH$_3$)—CO—, —NH—CO—, —CO—N(CH$_3$)—, and —CO—NH—, $S_1$ and $S_2$ are identical to or different from each other and are each independently one of a single bond and an optionally substituted alkylene group, $Q_1$ is a polymerizable group, $M_1$ is a group expressed by any of the following general formulae (2) to (8), $R_3$ and $R_4$ are identical to or different from each other and are each independently any one selected from the group consisting of —F, —Cl, —Br, —CH$_3$, —OCH$_3$, and —CN, $P_3$ and $P_4$ are identical to or different from each other and are each independently an integer of 0 to 4, and m is an integer of 0 to 3,

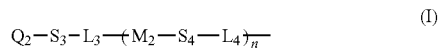

(I)

where in the above general formula (1), $L_3$ and $L_4$ are identical to or different from each other and are each independently any one selected from the group consisting of a single bond, —O—, —O—CO—, —O—CO—O—, —CO—O—, —S—, —N(CH$_3$)—, —NH—, —N(CH$_3$)—CO—, —NH—CO—, —CO—N(CH$_3$)—, and —CO—NH—, $S_3$ and $S_4$ are identical to or different from each other and are each independently one of a single bond and an optionally substituted alkylene group, $Q_2$ is a polymerizable group, $M_2$ is identical to or different from the $M_1$ and is a group expressed by any of the following general formulae (2) to (8), and n is an integer of 0 to 3,

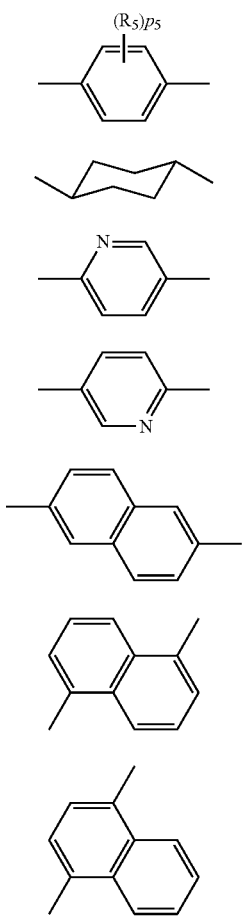

where in the above general formula (2), $R_5$ is any of —F, —Cl, —Br, —CH$_3$, —OCH$_3$, and —CN, and $P_5$ is an integer of 0 to 4,

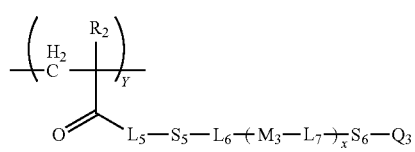

where in the above general formula (II), $R_2$ is one of a hydrogen atom and a methyl group, $L_5$ is any of a single bond, —O—, —NH—, and —N(CH$_3$)—, $L_6$ and $L_7$ are identical to or different from each other and are each independently any one selected from the group consisting of a single bond, —O—, —O—CO—, —O—CO—O—, —CO—O—, —S—, —N(CH$_3$)—, —NH—, —N(CH$_3$)—CO—, —NH—CO—, —CO—N(CH$_3$)—, and —CO—NH—, $S_5$ and $S_6$ are identical to or different from each other and are each independently one of a single bond and an optionally substituted alkylene group, $Q_3$ is a polymerizable group, $M_3$ is identical to or different from one of the $M_1$ and the $M_2$, and is a group expressed by any of the above general formulae (2) to (8), x is an integer of 1 to 5, and a parenthesis ( )$_Y$ indicates a repeating unit.

<2> The composition for a photo-alignment film according to <1>, wherein at least one of $Q_1$, $Q_2$, and $Q_3$ is an oxetane group.

<3> The composition for a photo-alignment film according to any of <1> or <2>, further containing a polymerization initiator.

<4> A photo-alignment film containing a film made from the composition for a photo-alignment film as defined in any one of <1> to <3>.

<5> A liquid crystal cell containing: a pair of substrates; and a liquid crystal composition sandwiched by the pair of substrates, wherein the photo-alignment film as defined in <4> is disposed on a surface of at least one of the pair of substrates, opposing the other substrate.

<6> A liquid crystal display containing the liquid crystal cell as defined in <5>.

<7> The liquid crystal display according to <6>, wherein the liquid crystal display is an IPS mode liquid crystal display or a TN mode liquid crystal display.

<8> A method for producing a photo-alignment film, containing: coating a surface of a support with the composition for a photo-alignment film as defined in any one of <1> to <3>; and irradiating a coating of the composition for a photo-alignment film with polarized light from any direction or unpolarized light from an oblique direction relative to a coating surface, as a first light irradiation step.

<9> The method for producing a photo-alignment film according to <8>, wherein the polarized light or unpolarized light irradiated in the first light irradiation step has a wavelength of 365 nm and a cumulative dose of 1 mJ/cm$^2$ to 20 mJ/cm$^2$.

<10> The method for producing a photo-alignment film according to any of <8> or <9>, further containing heating the composition for a photo-alignment film after the first light irradiation step, as a heating step.

<11> The method for producing a photo-alignment film according to <10>, a heating temperature in the heating step is 50° C. to 240° C.

<12> The method for producing a photo-alignment film according to any of <8> or <9>, further containing irradiating the coating of the composition for a photo-alignment film with unpolarized light from a normal direction relative to the coating surface after the first light irradiation step, as a second light irradiation step.

The present invention can provide a composition for a photo-alignment film, a photo-alignment film and a method for producing the same, a liquid crystal cell, and a liquid crystal display that have an excellent resistance to light and the like, and allow imparting alignment controllability for liquid crystal molecules with a small light irradiation dose.

DETAILED DESCRIPTION OF THE INVENTION

Composition for Photo-Alignment Film

A composition for a photo-alignment film of the present invention includes a compound expressed by the following general formula (I) and a compound expressed by the following general formula (II), and includes other components, such as a polymerization initiator, as necessary.

<Compound Expressed by General Formula (I)>

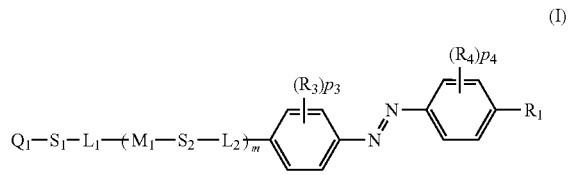
(I)

In the above general formula (I), $L_1$ and $L_2$ may be identical to or different from each other and each independently denote any of a single bond, —O—, —O—CO—, —O—CO—O—, —CO—O—, —S—, —N(CH$_3$)—, —NH—, —N(CH$_3$)—CO—, —NH—CO—, —CO—N(CH$_3$)—, and —CO—NH—.

Among these, the $L_1$ is preferably any of a single bond, —O—, —O—CO—, —O—CO—O—, and —CO—O—, and more preferably, any of a single bond, —O—, —O—CO—, and —O—CO—O—.

Among these, the $L_2$ is preferably any of a single bond, —O—, —O—CO—, —O—CO—O—, and —CO—O—, and more preferably, any of a single bond, —O—, —O—CO—, and —CO—O—.

In the above general formula (I), $S_1$ and $S_2$ may be identical to or different from each other, and each independently denote a single bond or an optionally substituted alkylene group.

The "optionally substituted alkylene group" means any of an unsubstituted alkylene group, an alkylene group where hydrogen atoms of —CH$_2$— were substituted by substituents, and an alkylene group where —CH$_2$— was substituted by —O— or —S—.

The substituents in the "alkylene group where hydrogen atoms of —CH$_2$— were substituted by substituents" are not particularly limited and can be appropriately selected according to the purpose, and examples thereof include a methyl group, a methoxy group, CN, F, Cl, and Br.

In the "alkylene group where —CH$_2$— was substituted by —O— or —S—," when two or more —CH$_2$— are to be substituted with —O— or —S—, —CH$_2$— that are not adjacent to each other are substituted with —O— or —S—. In addition, when two or more —CH$_2$— are to be substituted with —O— or —S—, these are substituted with —O— or —S— independently of each other. Moreover, in the "alkylene group where —CH$_2$— was substituted by —O— or —S—, hydrogen atoms may have been substituted by the substituents.

The $S_1$ is preferably a single bond or an optionally substituted alkylene group with 1 to 12 carbon atoms, and more preferably a single bond, an unsubstituted alkylene group with 2 to 8 carbon atoms, or —(CH$_2$—CH$_2$—O—CH$_2$—CH$_2$)—.

The $S_2$ is preferably a single bond or an optionally substituted alkylene group with 1 to 8 carbon atoms, and more preferably a single bond, an unsubstituted alkylene group with 1 to 4 carbon atoms, or —(CH$_2$—CH$_2$—O—CH$_2$—CH$_2$)—.

In the above general formula (I), $R_3$ and $R_4$ may be identical to or different from each other, and each independently denote any of a halogen atom, —CH$_3$, —OCH$_3$, and —CN.

Among these, $R_3$ and $R_4$ are preferably any of —F, —Cl, —Br, —CH$_3$, —OCH$_3$, and —CN, and more preferably, any of —F, —Cl, —CH$_3$, —OCH$_3$, and —CN, and even more preferably, any of —F, —CH$_3$, —OCH$_3$, and —CN.

In the above general formula (I), $P_3$ and $P_4$ may be identical to or different from each other, and each independently denote an integer of 0 to 4, and are preferably an integer of 0 to 2, and more preferably, an integer of 0 to 1.

In the above general formula (I), m denotes an integer of 0 to 3, and is preferably an integer of 0 to 2, and more preferably, an integer of 0 to 1.

In the above general formula (I), $M_1$ denotes a group expressed by any of the following general formulae (2) to (8), and among these, $M_1$ is preferably a group expressed by any of the following general formulae (2) to (6), and more preferably, a group expressed by any of the following general formulae (2), (4), and (5).

(2)

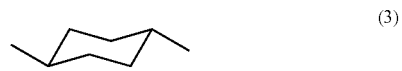
(3)

(4)

(5)

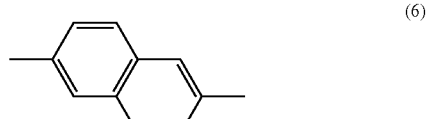
(6)

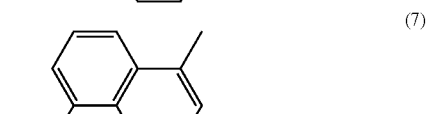
(7)

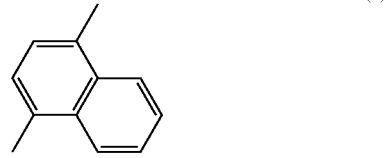
(8)

In the above general formula (2), $R_5$ denotes any of a halogen atom, —CH$_3$, —OCH$_3$, and —CN. Among these, $R_5$ is preferably any of —F, —Cl, —Br, —CH$_3$, —OCH$_3$, and —CN, and more preferably, any of —F, —Cl, —CH$_3$, —OCH$_3$, and —CN, and even more preferably, any of —F, —CH$_3$, —OCH$_3$, and —CN.

In the above general formula (2), $P_5$ denotes an integer of 0 to 4, and is preferably an integer of 0 to 2, and more preferably, an integer of 0 to 1.

In the above general formula (I), $Q_1$ denotes a polymerizable group.

The $Q_1$ may contain one polymerizable group, or may contain two or more polymerizable groups.

The $Q_1$ is not particularly limited and can be appropriately selected according to the purpose, and is preferably a group expressed by any of the following general formulae (9) to (17), and more preferably, an oxetane group expressed by the following general formula (16) or (17).

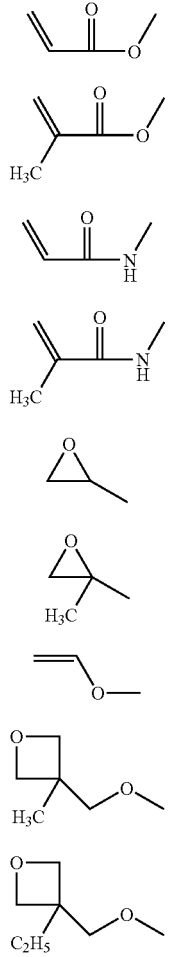

In the above general formula (I), $R_1$ denotes any of a hydrogen atom, a cyano group, a halogen atom, an alkyl group, an alkoxy group, $—N(CH_3)_2$, an alkylester group, and a group expressed by the following general formula (1). Among these, the $R_1$ is preferably a group expressed by the following general formula (1).

The alkyl group may be branched or unbranched, and is an alkyl group with 1 to 20 carbon atoms. Among these, the alkyl group is preferably any of a methyl group, an ethyl group, and an isopropyl group.

The alkoxy group (—O—R) may be branched or unbranched in its alkyl group part (—R), and has an alkyl group with 1 to 20 carbon atoms. Among these, the alkoxy group is preferably any of a methoxy group, an ethoxy group, and an isopropoxy group.

The alkylester group ($—CO_2—R$) may be branched or unbranched in its alkyl group part (—R), and has an alkyl group with 1 to 20 carbon atoms. Among these, the alkylester group is preferably any of a methylester group, an ethylester group, and an isopropylester group.

The halogen atom in the $R_1$ is preferably —F, —Cl, or —Br, and more preferably, —F or —Cl.

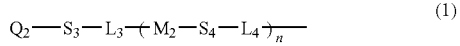

In the above general formula (1), $L_3$ and $L_4$ may be identical to or different from each other, and each independently denote any of a single bond, —O—, —O—CO—, —O—CO—O—, —CO—O—, —S—, $—N(CH_3)—$, —NH—, $—N(CH_3)—CO—$, —NH—CO—, —CO—N$(CH_3)—$, and —CO—NH—.

Among these, the $L_3$ is preferably any of a single bond, —O—, —O—CO—, —O—CO—O—, and —CO—O—, and more preferably, any of a single bond, —O—, —O—CO—, and —O—CO—O—.

Among these, the $L_4$ is preferably any of a single bond, —O—, —O—CO—, —O—CO—O—, and —CO—O—, and more preferably, any of a single bond, —O—, —O—CO—, and —CO—O—.

In the above general formula (1), $S_3$ and $S_4$ may be identical to or different from each other, and each independently denote a single bond or an optionally substituted alkylene group. The "optionally substituted alkylene group" is the same as the foregoing, and thus description thereof will be omitted.

The $S_3$ is preferably a single bond or an optionally substituted alkylene group with 1 to 12 carbon atoms, and more preferably, any of a single bond, an unsubstituted alkylene group with 2 to 8 carbon atoms, and $—(CH_2—CH_2—O—CH_2—CH_2)—$.

The $S_4$ is preferably a single bond or an optionally substituted alkylene group with 1 to 8 carbon atoms, and more preferably, any of a single bond, an unsubstituted alkylene group with 1 to 4 carbon atoms, and $—(CH_2—CH_2—O—CH_2—CH_2)—$.

In the above general formula (1), n denotes an integer of 0 to 3, and is preferably an integer of 0 to 2, and more preferably, an integer of 0 to 1.

In the above general formula (1), $M_2$ may be identical to or different from the above $M_1$, and denotes a group expressed by any of the above general formulae (2) to (8). Among these, $M_2$ is preferably a group expressed by any of the above general formulae (2) to (6), and more preferably, a group expressed by any of the above general formulae (2), (4), and (5).

In the above general formula (1), $Q_2$ denotes a polymerizable group.

The $Q_2$ may contain one polymerizable group, or may contain two or more polymerizable groups.

The $Q_2$ is not particularly limited and can be appropriately selected according to the purpose, and may be identical to or different from the above $Q_1$, and is more preferably a group expressed by any of the above general formulae (9) to (17), and even more preferably, a group expressed by the above general formula (16) or (17).

<Compound Expressed by General Formula (II)>

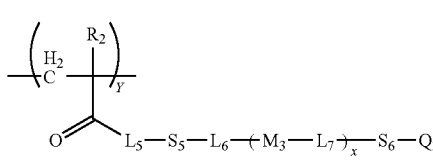

In the above general formula (II), $R_2$ denotes a hydrogen atom or a methyl group.

In the above general formula (II), $L_5$ denotes any of a single bond, —O—, —NH—, and —N(CH$_3$)—. Among these, $L_5$ is preferably any of —O—, —NH—, and —N(CH$_3$)—, and more preferably, —O— or —NH—.

In the above general formula (II), $L_6$ and $L_7$ may be identical to or different from each other, and each independently denote any of a single bond, —O—, —O—CO—, —O—CO—O—, —CO—O—, —S—, —N(CH$_3$)—, —NH—, —N(CH$_3$)—CO—, —NH—CO—, —CO—N(CH$_3$)—, and —CO—NH—.

Among these, the $L_6$ is preferably any of a single bond, —O—, —O—CO—, —O—CO—O—, and —CO—O—, and more preferably, any of a single bond, —O—, —O—CO—, and —O—CO—O—.

Among these, the $L_7$ is preferably any of a single bond, —O—, —O—CO—, —O—CO—O—, and —CO—O—.

In the above general formula (II), $S_5$ and $S_6$ may be identical to or different from each other, and each independently denote a single bond or an optionally substituted alkylene group. The "optionally substituted alkylene group" is the same as the foregoing, and thus description thereof will be omitted.

The $S_5$ and $S_6$ are preferably a single bond or an optionally substituted alkylene group with 1 to 12 carbon atoms, and more preferably, any of a single bond, an unsubstituted alkylene group with 2 to 8 carbon atoms, and —(CH$_2$—CH$_2$—O—CH$_2$—CH$_2$)—.

In the above general formula (II), x denotes an integer of 1 to 5.

In the above general formula (II), a parenthesis ( )$_Y$ denotes a repeating unit.

In the above general formula (II), $Q_3$ denotes a polymerizable group.

The $Q_3$ may contain one polymerizable group, or may contain two or more polymerizable groups.

The $Q_3$ is not particularly limited and can be appropriately selected according to the purpose, and may be identical to or different from the above $Q_1$ or $Q_2$, and is more preferably a group expressed by any of the above general formulae (9) to (17), and even more preferably, a group expressed by the above general formula (16) or (17).

In the above general formula (II), $M_3$ may be identical to or different from the above $M_1$ or the above $M_2$, and denotes a group expressed by any of the above general formulae (2) to (8). Among these, $M_3$ is preferably a group expressed by any of the above general formulae (2) to (6), and more preferably, a group expressed by any of the above general formulae (2), (4), and (5).

The weight average molecular weight (Mw) of the compound expressed by the above general formula (II) is not particularly limited as long as it is 2,000 or more and can be appropriately selected according to the purpose, but is preferably, 5,000 or more.

The followings are examples of the compound expressed by general formula (I), however, the present invention is not limited to these.

In the following examples, Me denotes a methyl group.

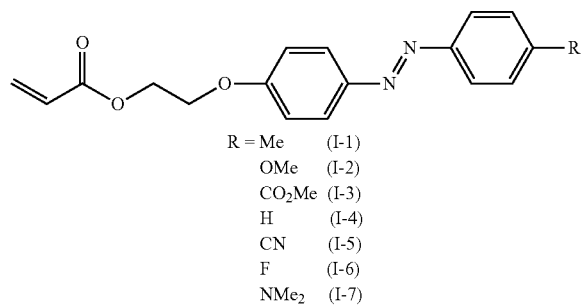

R = Me (I-1)
OMe (I-2)
CO$_2$Me (I-3)
H (I-4)
CN (I-5)
F (I-6)
NMe$_2$ (I-7)

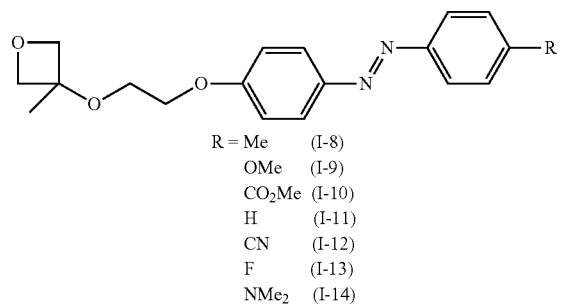

R = Me (I-8)
OMe (I-9)
CO$_2$Me (I-10)
H (I-11)
CN (I-12)
F (I-13)
NMe$_2$ (I-14)

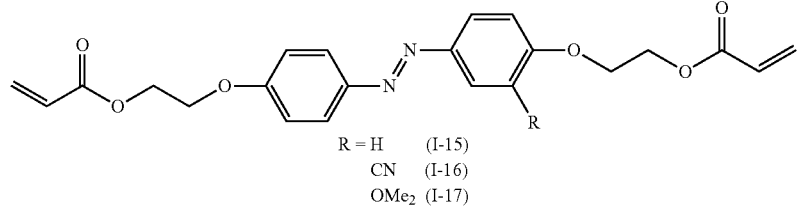

R = H (I-15)
CN (I-16)
OMe$_2$ (I-17)

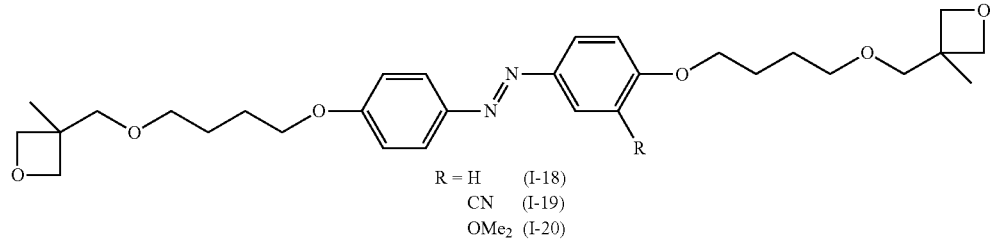

R = H (I-18)
CN (I-19)
OMe$_2$ (I-20)

(I-21)

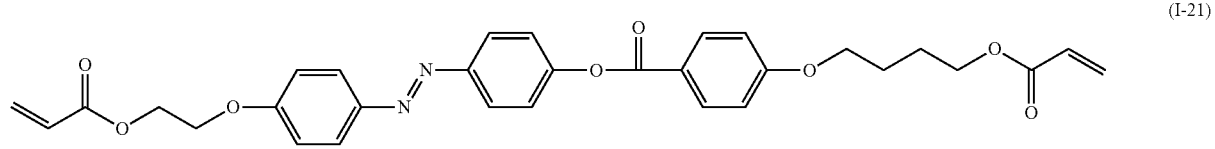

-continued
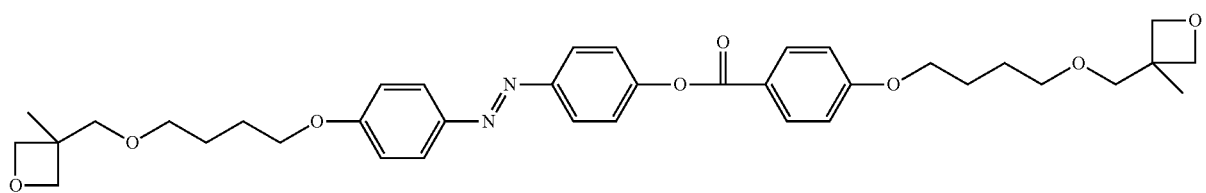
(I-22)
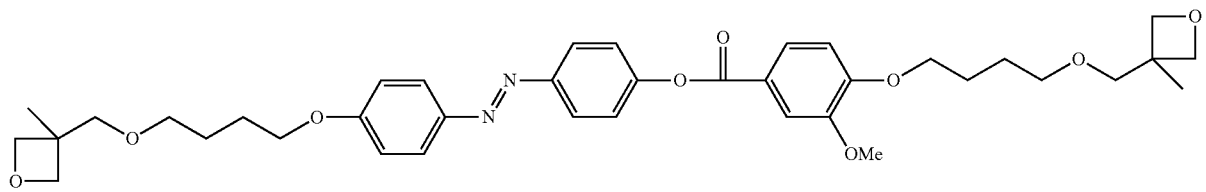
(I-23)
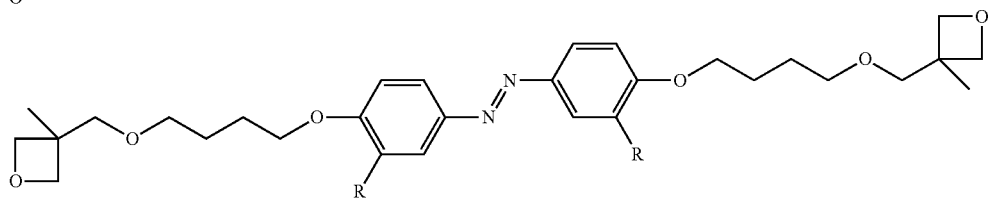
R = CN (I-24)
R = OMe₂ (I-25)
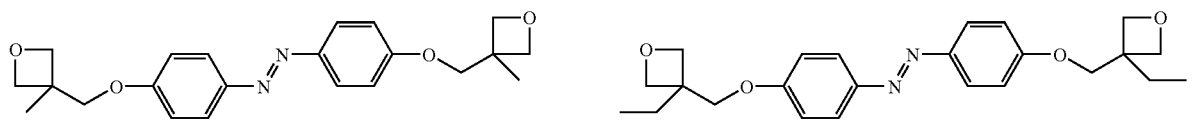
(I-26) (I-27)
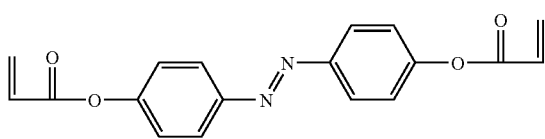
(I-28)
The followings are examples of the compound expressed by general formula (II), however, the present invention is not limited to these.
In the following examples, Me denotes a methyl group, and a parenthesis ( )_Y denotes a repeating unit.
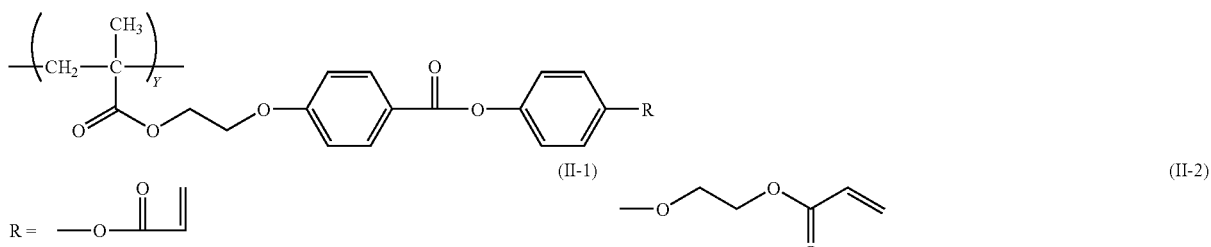
(II-1)
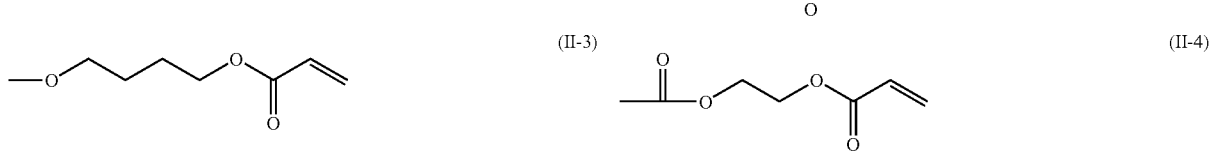
(II-2) (II-3) (II-4)

-continued
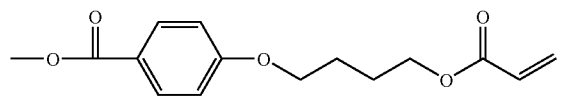
(II-5)
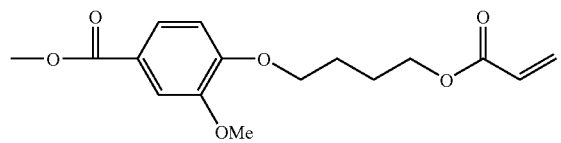
(II-6)
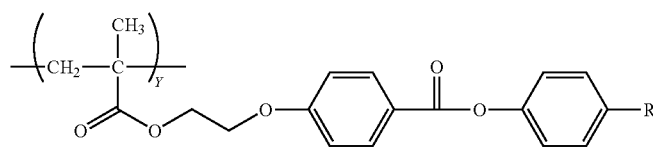
(II-7)
R = 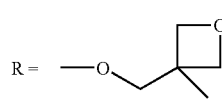
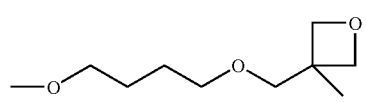
(II-8)
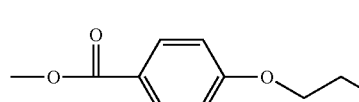
(II-9)
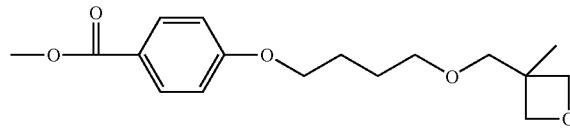
(II-10)
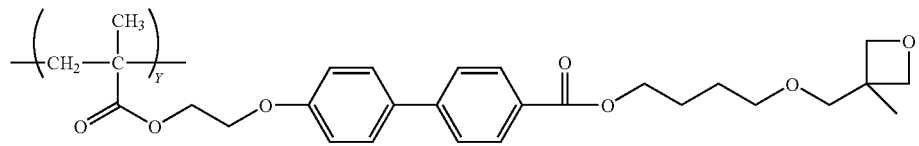
(II-11)
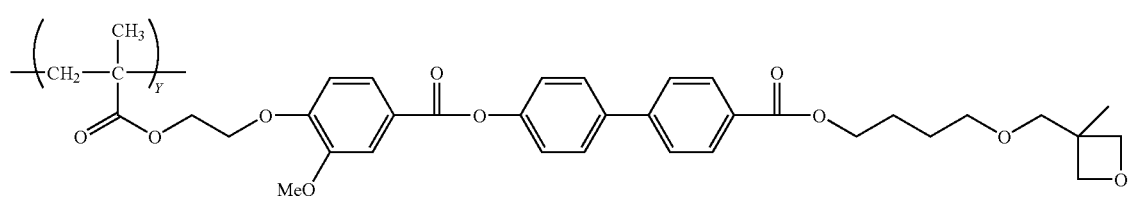
(II-12)
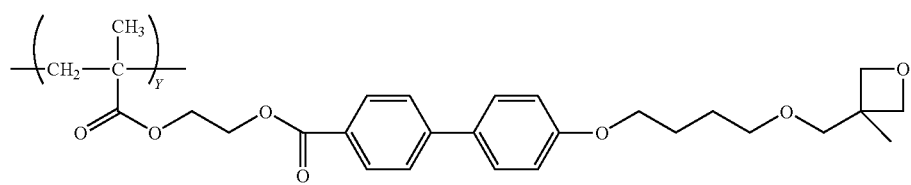
(II-13)
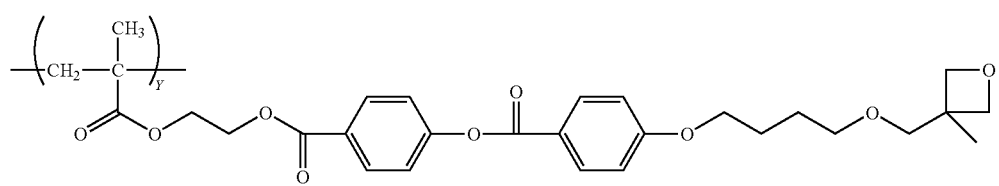
(II-14)
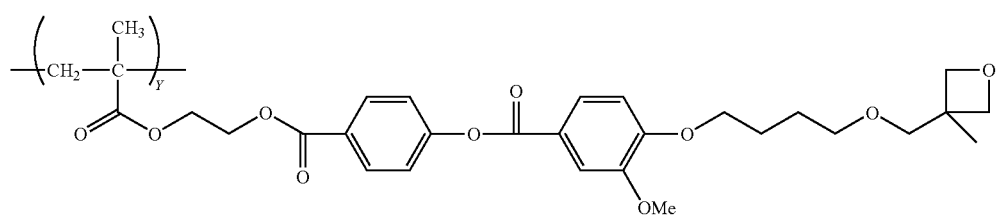
(II-15)
(II-16)
(II-17)

-continued

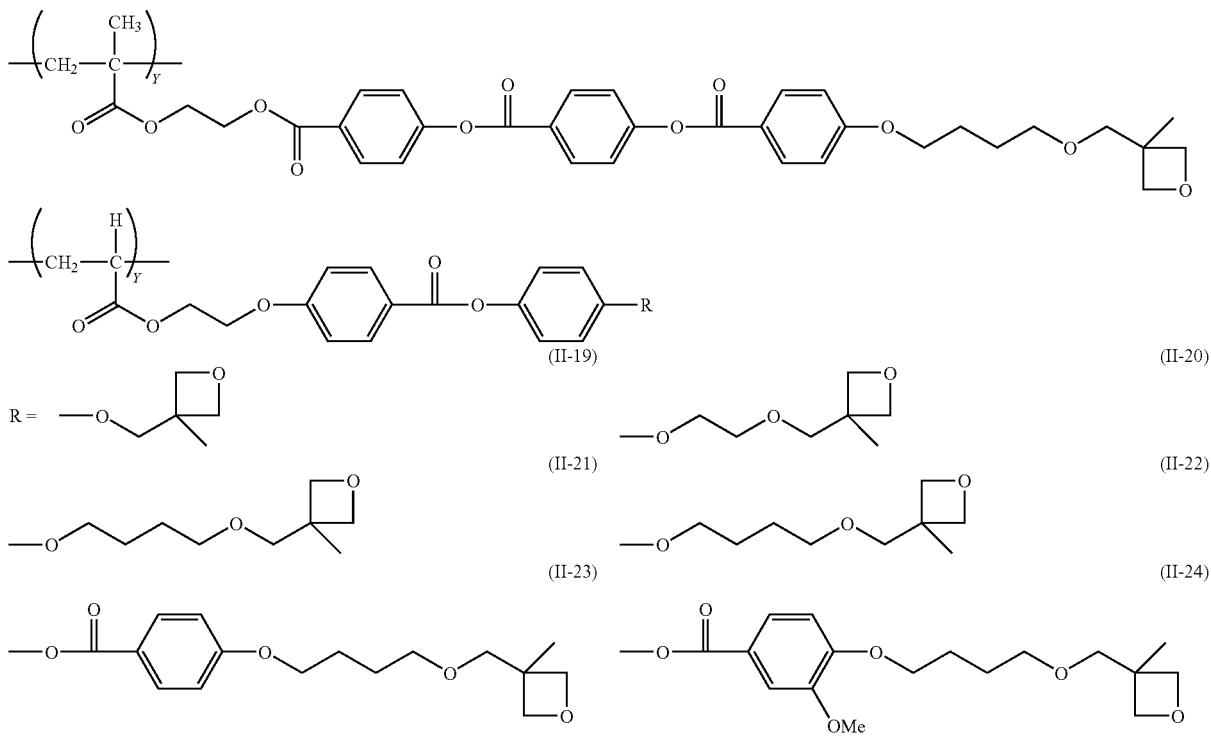

The amount of the compound expressed by the above general formula (I) contained in the composition for a photo-alignment film is not particularly limited and can be appropriately selected according to the purpose. The amount of the compound expressed by the above general formula (II) contained in the composition for a photo-alignment film is also not particularly limited and can be appropriately selected according to the purpose.

The blending ratio of the amount of the compound expressed by the above general formula (I) and the compound expressed by the above general formula (II) in the composition for a photo-alignment film is not particularly limited and can be appropriately selected according to the purpose, but is preferably 80 parts by mass 20 parts by mass to 5 parts by mass:95 parts by mass, and more preferably, 60 parts by mass:40 parts by mass to 5 parts by mass:95 parts by mass.

If the blending amount of the amount of the compound expressed by the above general formula (I) is more than 80 parts by mass to 20 parts by mass of the compound expressed by the above general formula (II), the photo-alignment film may be colored under the influence of an azo group. If the blending amount of the amount of the compound expressed by the above general formula (I) is less than 5 parts by mass to 95 parts by mass of the compound expressed by the above general formula (II), alignment controllability for liquid crystal molecules may not be imparted even when the composition for a photo-alignment film is irradiated with light. If the blending ratio is in the more preferable range stated above, it is advantageous in that excellent alignment controllability for liquid crystal molecules is imparted with a small light irradiation dose without the composition for a photo-alignment film being colored.

A method for producing the compound expressed by the above structural formula (I-18), which is a typical compound of the compounds expressed by the above general formula (I), will hereinafter be described concretely and in detail in Example 1. A person skilled in the art can produce any of the compounds indicated in the above general formula (I) by appropriately selecting starting compounds, reaction conditions, reagents, etc., and adding appropriate alteration or modification to the method, if necessary, while referring to the concrete explanation of the example.

In addition, a method for producing the compound expressed by the above structural formula (II-9), which is a typical compound of the compounds expressed by the above general formula (II), will hereinafter be described concretely and in detail in Example 1. A person skilled in the art can produce any of the compounds indicated in the above general formula (II) by appropriately selecting starting compounds, reaction conditions, reagents, etc., and adding appropriate alteration or modification to the method, if necessary, while referring to the concrete explanation of the example.

—Polymerization Initiator—

The polymerization initiator is not particularly limited and can be selected according to the polymerizable groups in the compounds expressed by the above general formula (I) and the compounds expressed by the above general formula (II), and examples thereof include a radical polymerization initiator and a cation polymerization initiator. The radical polymerization initiator and the cation polymerization initiator each include a thermal polymerization initiator to be used for a thermal polymerization reaction and a photopolymerization initiator to be used for a photopolymerization reaction.

Examples of the thermal polymerization initiator in radical polymerization include azobisisobutyronitrile.

Examples of the photopolymerization initiator in radical polymerization include α-carbonyl compounds (described in the respective specifications of U.S. Pat. Nos. 2,367,661 and 2,367,670), acyloin ethers (described in the specification of U.S. Pat. No. 2,448,828), α-hydrocarbon-substituted aromatic acyloin compounds (described in the specification of U.S. Pat. No. 2,722,512), polynuclear quinone compounds (described in the respective specifications of U.S. Pat. No. 3,046,127 and U.S. Pat. No. 2,951,758), combinations of triarylimidazole dimers and p-aminophenyl ketone (described in the specification of U.S. Pat. No. 3,549,367), acridine and phenazine compounds (described in JP-A No. 60-105667 and the specification of U.S. Pat. No. 4,239,850), and oxadiazole compounds (described in the specification of U.S. Pat. No. 4,212,970).

Examples of the thermal polymerization initiator in cation polymerization include benzylsulfonium salt compounds.

Examples of the photopolymerization initiator in cation polymerization include organic sulfonium salts, iodonium salts, and phosphonium salts. Counterions of these compounds include $SbF_6^-$, $PF_6^-$, and $BF_6^-$.

The amount of the polymerization initiator contained in the composition for a photo-alignment film is not particularly limited and can be appropriately selected according to the purpose, but is preferably 0.1% by mass to 10% by mass, more preferably, 0.1% by mass to 8% by mass, and particularly preferably, 0.1% by mass to 7% by mass, with respect to the composition for a photo-alignment film. If the amount is less than 0.1% by mass, polymerization may not be sufficiently performed. If the amount is more than 10% by mass, liquid crystal alignability may decline. If the amount is in the particularly preferable range stated above, it is advantageous in that polymerization is sufficiently performed and liquid crystal alignability is high.

(Photo-Alignment Film)

A photo-alignment film of the present invention is made from the composition for a photo-alignment film.

The film thickness of the photo-alignment film is not particularly limited and can be appropriately selected according to the purpose, but is preferably 10 nm to 500 nm, more preferably, 10 nm to 300 nm, and even more preferably, 10 nm to 100 nm.

(Method for Producing Photo-Alignment Film)

A method for producing a photo-alignment film of the present invention includes a coating step which is coating the surface of a support with the composition for a photo-alignment film, a first light irradiation step which is irradiating a coating of the composition for a photo-alignment film with polarized light from any direction or unpolarized light from an oblique direction relative to the coating surface, and includes other steps, as necessary.

—Coating Step—

The method for coating the surface of a support with the composition for a photo-alignment film is not particularly limited and can be appropriately selected according to the purpose, and examples thereof include spin coating, die coating, gravure coating, flexography, and ink-jet printing.

In the coating step, it is preferable, when coating the surface of a support with the composition for a photo-alignment film, to use the composition for a photo-alignment film dissolved in a solvent as a coating liquid.

The solvent is not particularly limited as long as it can dissolve the composition for a photo-alignment film, but with respect to ease in application, it is preferable that the vapor pressure thereof at room temperature is relatively low and the boiling point thereof is high. Examples of the solvent include 1,1,2-trichloroethane, N-methylpyrrolidone, butoxyethanol, γ-butyrolactone, ethylene glycol, polyethylene glycol monomethyl ether, propylene glycol, 2-pyrrolidone, N,N-dimethylformamide, phenoxyethanol, tetrahydrofuran, dimethylsulfoxide, methylisobutyl ketone, and cyclohexanone. As the solvent, one of these may be used alone or two or more may be used in combination.

The support is not particularly limited as long as a coating of the composition for a photo-alignment film can be formed when the composition for a photo-alignment film is applied to the surface of the support, but is usually a substrate for sandwiching a liquid crystal composition in a liquid crystal cell.

—First Light Irradiation Step—

In the first light irradiation step, a coating of the composition for a photo-alignment film is irradiated with polarized light from any direction or unpolarized light from an oblique direction relative to the coating surface.

The polarized light is not particularly limited, and examples thereof include linearly polarized light, circularly polarized light, and elliptically polarized light, and among these, linearly polarized light is preferable.

The "oblique direction of the coating surface" is not particularly limited as long as it is a direction tilted by a polar angle θ (0<θ<90°) with respect to the normal direction to the coating surface and can be appropriately selected according to the purpose, but is preferably a direction where the θ is 20° to 80°.

The polarized light or the unpolarized light is not particularly limited in wavelength as long as it allows imparting alignment controllability for liquid crystal molecules to a coating of the composition for a photo-alignment film, and examples thereof include ultraviolet light, near-ultraviolet light, and visible light. Among these, a near-ultraviolet light of 350 nm to 450 nm is particularly preferable.

Examples of a light source to irradiate the polarized light or the unpolarized light include a xenon lamp, a high-pressure mercury lamp, a super high-pressure mercury lamp, and a metal halide lamp. Using interference filters and color filters for ultraviolet light and visible light obtained from such light sources allows limiting the wavelength range of irradiation. In addition, using polarizing filters and polarizing prisms for light from these light sources allows obtaining linearly polarized light.

The polarized light or the unpolarized light is not particularly limited in cumulative dose as long as it allows imparting alignment controllability for liquid crystal molecules to a coating of the composition for a photo-alignment film, and the cumulative dose can be appropriately selected according to the purpose, but from the standpoint of producing a photo-alignment film with a lower irradiation dose, it is particularly preferable to irradiate a polarized light or unpolarized light having a wavelength of 365 nm at cumulative dose of 1 $mJ/cm^2$ to 20 $mJ/cm^2$.

The polarized light or the unpolarized light is not particularly limited in irradiance as long as it allows imparting alignment controllability for liquid crystal molecules to a coating of the composition for a photo-alignment film, and the irradiance is preferably 0.1 $mW/cm^2$ to 100 $mW/cm^2$, more preferably, 0.1 $mW/cm^2$ to 70 $mW/cm^2$, and even more preferably, 0.1 $mW/cm^2$ to 50 $mW/cm^2$.

Since the composition for a photo-alignment film includes the compound expressed by the above general formula (I) and the compound expressed by the above general formula (II), alignment controllability for liquid crystal molecules can be favorably imparted to a coating of the composition for a photo-alignment film even with such a small cumulative dose and a small irradiance as in the above.

—Other Steps—

Examples of other steps include a heating step which is heating the composition for a photo-alignment film after the first light irradiation step and a second light irradiation step which is irradiating a coating of the composition for a photo-alignment film with unpolarized light from the normal direction relative to the coating surface after the first light irradiation step.

As other steps, only the heating step may be performed, or only the second light irradiation step may be performed, or both steps may be performed. When the heating step and the second light irradiation step are performed, either step may be performed first.

—Heating Step—

In the heating step, the composition for a photo-alignment film is heated to thereby allow polymerization of the compound expressed by the above general formula (I) and the compound expressed by the above general formula (II) to progress.

The heating step is not particularly limited in heating temperature as long as it can allow polymerization of the compound expressed by the above general formula (I) and the compound expressed by the above general formula (II) to progress, and the heating temperature can be appropriately selected according to the purpose, but generally, the heating temperature is 50° C. to 240° C., preferably, 80° C. to 200° C., and more preferably, 80° C. to 190° C.

As a result of the heating step allowing polymerization of the compound expressed by the above general formula (I) and the compound expressed by the above general formula (II) to progress, a coating (photo-alignment film) of the composition for a photo-alignment film is polymerized in a state of having alignment controllability for liquid crystal molecules, and thus resistance to heat and light can be improved.

—Second Light Irradiation Step—

In the second light irradiation step, a coating of the composition for a photo-alignment film is irradiated with unpolarized light from the normal direction relative to the coating surface to thereby allow polymerization of the compound expressed by the above general formula (I) and the compound expressed by the above general formula (II) to progress.

The unpolarized light is not particularly limited in wavelength as long as it can allow polymerization of the compound expressed by the above general formula (I) and the compound expressed by the above general formula (II) to progress, and the wavelength can be appropriately selected according to the purpose, but the unpolarized light preferably has a peak at a wavelength of 250 nm to 450 nm, and more preferably has a peak at a wavelength of 300 nm to 410 nm.

The unpolarized light is not particularly limited in cumulative dose as long it can allow polymerization of the compound expressed by the above general formula (I) and the compound expressed by the above general formula (II) to progress, and the cumulative dose can be appropriately selected according to the purpose, but it is preferably 5 mJ/cm$^2$ to 10 J/cm$^2$, more preferably, 5 mJ/cm$^2$ to 5 J/cm$^2$.

The unpolarized light is not particularly limited in irradiance as long it can allow polymerization of the compound expressed by the above general formula (I) and the compound expressed by the above general formula (II) to progress, and the irradiance can be appropriately selected according to the purpose, but it is preferably 5 mW/cm$^2$ to 1,000 mW/cm$^2$, and more preferably, 5 mW/cm$^2$ to 500 mW/cm$^2$, and even more preferably, 5 mW/cm$^2$ to 350 mW/cm$^2$.

It is preferable in the point of promoting the polymerization reaction that irradiation of the unpolarized light is performed under nitrogen atmosphere or under heating conditions.

As a result of the second light irradiation step allowing polymerization of the compound expressed by the above general formula (I) and the compound expressed by the above general formula (II) to progress, a coating (photo-alignment film) of the composition for a photo-alignment film is polymerized in a state of having alignment controllability for liquid crystal molecules, and thus resistance to heat and light can be improved.

(Liquid Crystal Cell)

A liquid crystal cell of the present invention is a liquid crystal cell including a pair of substrates and a liquid crystal composition sandwiched by the pair of substrate, wherein the photo-alignment film is disposed on a surface of at least one of the pair of substrates, and the surface opposes the other substrate.

The construction of the photo-alignment film is as has already been described, and thus description thereof will be omitted.

The photo-alignment film may be disposed only on one of the pair of substrates, or may be disposed on both of the opposing substrates.

—Substrate—

The material of the substrate is not particularly limited, and either an organic material or an inorganic material can be used. Examples of the organic material include polyethylene terephthalate, polycarbonate, and triacetyl cellulose. Examples of the inorganic material include glass and silicon. In addition, the substrate may be provided with an electrode layer of ITO, Cr, Al, etc., a color filter layer, and the like.

—Liquid Crystal Composition—

The liquid crystal composition is not particularly limited as long as it includes liquid crystal molecules, and can be selected from conventionally known compositions.

(Liquid Crystal Display)

A liquid crystal display of the present invention has the liquid crystal cell.

The liquid crystal display is not particularly limited and can be appropriately selected according to the purpose, and examples thereof include an IPS (In-Plane Switching) mode liquid crystal display and a TN (Twisted Nematic) mode liquid crystal display. Among these, the IPS mode liquid crystal display is preferable in the point that the photo-alignment film is useful as a horizontal alignment film to horizontally align liquid crystal molecules.

EXAMPLES

Hereinafter, examples of the present invention will be explained, however, the present invention is by no means limited to the following examples.

Al part(s) are by mass unless indicated otherwise.

Example 1

Synthesis of Compound Expressed by Structural Formula (I-18)

The compound expressed by the above structural formula (I-18) was synthesized according to the following synthesis route.

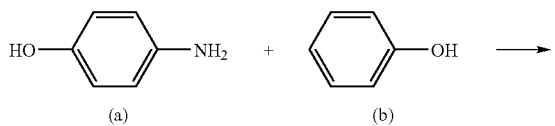

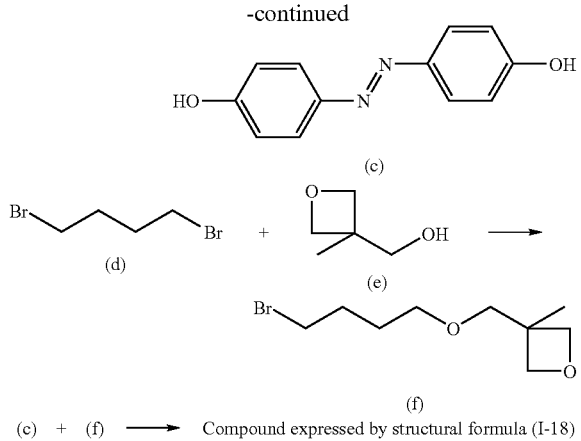

(c) + (f) ⟶ Compound expressed by structural formula (I-18)

After cooling 470 mL of a 1N hydrochloric acid solution of compound (a) (275 mmol) to an internal temperature of 0° C., 93 mL of an aqueous NaNO₂ solution (275 mmol) was slowly delivered by drops. After dropping, 240 mL of methanol was added and the mixture was stirred for 1 hour. Then, compound (b) (275 mmol), KOH (522 mmol), and 187 mL of methanol were added, the mixture was stirred for 2 hours, and then 288 mL of 1N hydrochloric acid was added. After stirring the mixture for 30 minutes, a deposit was filtered out, and the residue was purified by silica gel column chromatography (eluate:hexane/ethyl acetate=3/2) to obtain compound (c). In this step, the yield of compound (c) was 7%.

After adding a 50% aqueous NaOH solution (1920 g), compound (e) (1.47 mol), and compound (d) (4.41 mol) to 1,470 mL of a hexane solution of tetrabutylammonium bromide (0.0759 mol) and stirring the mixture for 30 minutes at room temperature, the mixture was refluxed for 4 hours. Then, the mixture was returned to room temperature and the organic layer was washed three times with water. After drying the organic layer with anhydrous magnesium sulfate, the solvent was distilled away under reduced pressure and purification by distillation was performed to obtain compound (f). In this step, the yield of compound (f) was 41.5%.

To 60 mL of a dimethyl acetamide solution of compound (c) (10 mmol), compound (1) (22 mmol) and potassium carbonate (45 mmol) were added, and the mixture was warmed to 100° C. and stirred for 4 hours. Ethyl acetate was added thereto, and the organic layer was washed twice with dilute hydrochloric acid. After drying the organic layer with anhydrous magnesium sulfate, the solvent was distilled away under reduced pressure and the residue was purified by silica gel column chromatography (eluate:hexane/ethyl acetate=3/1) to obtain the compound expressed by the above structural formula (I-18). In this step, the yield of the compound expressed by the above structural formula (I-18) was 52%.

As a result of mass spectrometry performed for the synthesized compound expressed by the above structural formula (I-18), a peak of 527.30 (M+1) was detected.

Synthesis of Compound Expressed by Structural Formula (II-9)

The compound expressed by the above structural formula (II-9) was synthesized according to the following synthesis route.

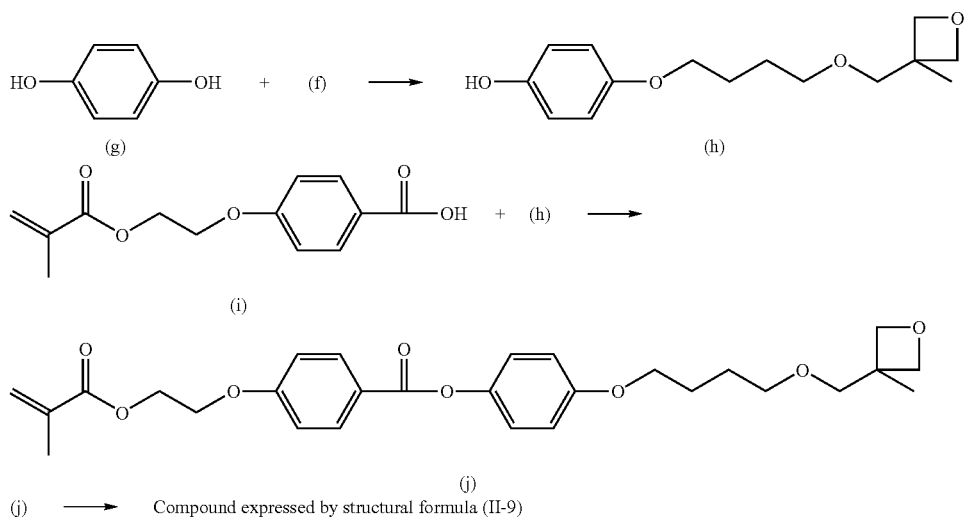

(j) ⟶ Compound expressed by structural formula (II-9)

In the above synthesis route, the step of synthesizing compound (i) was performed according to the description of JP-A No. 2002-097170. In addition, compound (f) in the above synthesis route was the same as compound (f) used in the synthesis step of the compound expressed by the above structural formula (I-18).

To 500 mL of a dimethyl acetamide solution of compound (g) (400 mmol), compound (f) (100 mmol) and potassium carbonate (120 mmol) were added, and the mixture was warmed to 90° C. and stirred for 3 hours. Ethyl acetate was added thereto, and the organic layer was washed twice with dilute hydrochloric acid. After drying the organic layer with anhydrous magnesium sulfate, the solvent was distilled away under reduced pressure and the residue was purified by silica gel column chromatography (eluate:hexane/ethyl acetate=3/1) to obtain compound (h). In this step, the yield of compound (h) was 40%.

To 50 mL of a tetrahydrofuran solution of compound (i) (11.6 mmol), a tetrahydrofuran solution (10 mL) of methane sulfonyl chloride (11.6 mmol) and diisopropylethylamine (14.6 mmol) was delivered by drops under icing. After dropping, the mixture was warmed to room temperature and stirred for 1.5 hours. Then, the mixture was iced, 20 mL of a tetrahydrofuran solution of compound (h) (5.84 mmol) was added thereto, and further, 10 mL of a tetrahydrofuran solution of diisopropylethylamine (14.6 mmol) was delivered by drops. After completion of the dropping, a catalytic amount of N,N-dimethylaminopyridine was added, and the mixture was warmed to room temperature and stirred for 3 hours. Ethyl acetate was added thereto, and the organic layer was washed twice with dilute hydrochloric acid. After drying the organic layer with anhydrous magnesium sulfate, the solvent was distilled away under reduced pressure and the residue was purified by silica gel column chromatography (eluate:hexane/ethyl acetate=2/1) to obtain compound (j). In this step, the yield of compound (j) was 50%.

Compound (j) (0.825 mmol) and 7.4 mL of a dimethyl acetamide solution of AIBN (16 mg) were stirred under nitrogen atmosphere at an external temperature of 70° C. for 7 hours. After stirring, purification by methanol was performed to obtain the compound expressed by the above structural formula (II-9). In this step, the yield of the compound expressed by the above structural formula (II-9) was 60%.

As a result of mass spectrometry performed for the synthesized compound expressed by the above structural formula (II-9), a peak of 499.23 (M+1) was detected.

—Production of Composition for Photo-Alignment Film—

The following components were mixed to produce a composition for a photo-alignment film.

| | |
|---|---|
| Compound expressed by structural formula (I-18) | 0.96 parts |
| Compound expressed by structural formula (II-9) | 0.96 parts |
| Polymerization initiator triarylsulfonium hexafluorophosphate 50% propylene carbonate solution (manufactured by Aldrich Corp.) | 0.08 parts |
| 1,1,2-trichloroethane | 98 parts |

—Production of Photo-Alignment Film—

The composition for a photo-alignment film was applied onto a glass substrate by a spin coating method (3,500 rpm, 20 seconds), and the surface coated with the composition for a photo-alignment film was then irradiated with a polarized ultraviolet light having a wavelength of 365 nm from a normal direction relative to the coating surface so that the cumulative dose became 15 mJ/cm$^2$.

Then, under air, an unpolarized ultraviolet light was irradiated at 70° C. by a high-pressure mercury lamp so that the cumulative dose became 50 mJ/cm$^2$ to produce a photo-alignment film of Example 1.

Example 2

A photo-alignment film of Example 2 was produced in the same manner as in Example 1, except that the blending amount of the compound expressed by structural formula (I-18) in the composition for a photo-alignment film was set to 1.536 parts in place of 0.96 parts provided in Example 1, and the blending amount of the compound expressed by structural formula (II-9) in the composition for a photo-alignment film was set to 0.384 parts in place of 0.96 parts provided in Example 1.

Example 3

A photo-alignment film of Example 3 was produced in the same manner as in Example 1, except that the blending amount of the compound expressed by structural formula (I-18) in the composition for a photo-alignment film was set to 0.096 parts in place of 0.96 parts provided in Example 1, and the blending amount of the compound expressed by structural formula (II-9) in the composition for a photo-alignment film was set to 1.824 parts in place of 0.96 parts provided in Example 1.

Example 4

A photo-alignment film of Example 4 was produced in the same manner as in Example 1, except that the blending amount of the compound expressed by structural formula (I-18) in the composition for a photo-alignment film was set to 1.632 parts in place of 0.96 parts provided in Example 1, and the blending amount of the compound expressed by structural formula (II-9) in the composition for a photo-alignment film was set to 0.288 parts in place of 0.96 parts provided in Example 1.

Example 5

A photo-alignment film of Example 5 was produced in the same manner as in Example 1, except that the blending amount of the compound expressed by structural formula (I-18) in the composition for a photo-alignment film was set to 0.0576 parts in place of 0.96 parts provided in Example 1, and the blending amount of the compound expressed by structural formula (II-9) in the composition for a photo-alignment film was set to 1.8624 parts in place of 0.96 parts provided in Example 1.

Comparative Example 1

Production of Composition for Photo-Alignment Film

A composition for a photo-alignment film was produced in the same manner as in Example 12 described in JP-A No. 2007-121721.

More specifically, 2 parts of a compound expressed by the following structural formula (a) was dissolved in 98 parts of N-methyl-2-pyrrolidone (NMP) (solution A). Ninety-eight parts of 2-butoxyethanol (BC) was added to 2 parts of methylated melamine Sumimarl M-100 (hereinafter, referred to as M-100C) (manufactured by Chang Chun Plastics Co., LTD.; the molecular weight in terms of a hexamethoxymethylated melamine monomer was 390; the average degree of polymerization was 1.3 to 1.7.) to be a homogeneous solution (solution B). 100 parts of solution A, 15 parts of solution B, 77 parts of BC, and 5.1 parts of BX-L (a polyvinyl acetal resin S-Lec manufactured by SEKISUI CHEMICAL CO., LTD.) were mixed to prepare a solution having a solid content of 1.0%. The obtained solution was filtered through a membrane filter of 0.45 μm to obtain a composition for a photo-alignment film.

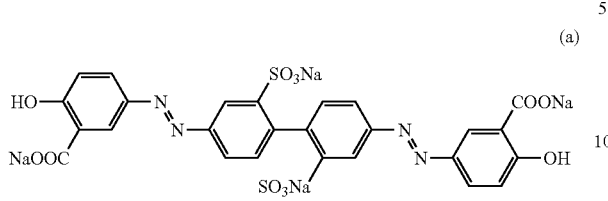

(a)

—Production of Photo-Alignment Film—

The composition for a photo-alignment film was applied onto a glass substrate by a spin coating method (3,500 rpm, 20 seconds), and the surface coated with the composition for a photo-alignment film was then irradiated with a polarized ultraviolet light having a wavelength of 365 nm from a normal direction relative to the coating surface so that the cumulative dose became 15 mJ/cm$^2$.

Then, the coating was heated at 220° C. for 20 minutes to produce a photo-alignment film of Comparative Example 1.

(1) Alignability Evaluation

To each of the photo-alignment films produced in Examples 1 to 5 and Comparative Example 1, an isopropyl alcohol solution of a liquid crystal composition containing the following components was applied by a spin coating method (2,000 rpm, 20 seconds), and the coating was then heated at 80° C. for 10 seconds and returned to room temperature for an observation of liquid crystal alignability, and the alignability was evaluated according to the following evaluation criteria. The results are shown in Table 1.

—Liquid Crystal Composition—

<Criteria for Alignability Evaluation>

A: Almost no light leakage was observed under crossed nicols.

A-B: Better than B, but a slight light leakage was observed.

B: A little light leakage was observed under crossed nicols.

C: Light leakage was observed under crossed nicols.

(2) Light Resistance Evaluation

Each of the photo-alignment films produced in Examples 1 to 5 and Comparative Example 1 was irradiated with an unpolarized ultraviolet light having a wavelength of 365 nm so that the cumulative dose became 50 J/cm$^2$. Next, to each of the photo-alignment films, in the same manner as in the above "(1) Alignability evaluation," an isopropyl alcohol solution of a liquid crystal composition containing the above components was applied by a spin coating method (2,000 rpm, 20 seconds), and the coating was then heated at 80° C. for 10 seconds and returned to room temperature for an observation of liquid crystal alignability, and light resistance was evaluated according to the following evaluation criteria. The results are shown in Table 1.

<Criteria for Light Resistance Evaluation>

A: Light leakage had changed little compared to when an unpolarized ultraviolet light having a wavelength of 365 nm was not irradiated in the above light resistance evaluation.

A-B: Better than B, but light leakage had slightly worsened.

B: Light leakage had slightly worsened compared to when an unpolarized ultraviolet light having a wavelength of 365 nm was not irradiated in the above light resistance evaluation.

C: Light leakage had apparently worsened compared to when an unpolarized ultraviolet light having a wavelength of 365 nm was not irradiated in the above light resistance evaluation.

| | |
|---|---|
| MLC-16000-100 (a liquid crystal compound manufactured by Merck KGaA) | 34.9 parts |
| Air interface control agent (A) shown in the following | 0.0349 parts |
| Isopropyl alcohol | 65 parts |

Air interface control agent (A)

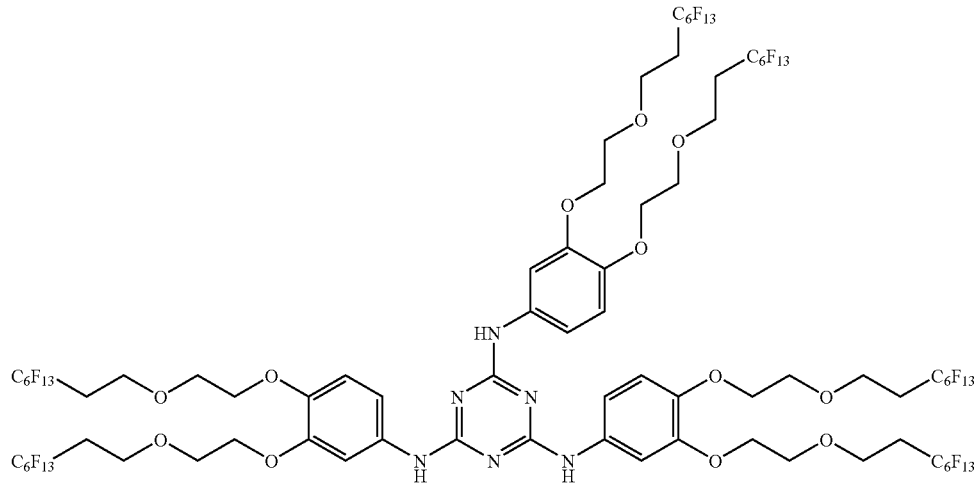

TABLE 1

| | Blending amount of compound expressed by structural formula (I-18) (parts by mass) | Blending amount of compound expressed by structural formula (II-9) (parts by mass) | Irradiation dose (mJ/cm$^2$) | Alignability | Light resistance |
|---|---|---|---|---|---|
| Example 1 | 0.96 | 0.96 | 15 | A | A |
| Example 2 | 1.536 | 0.384 | 15 | A | A |
| Example 3 | 0.096 | 1.824 | 15 | A | A |
| Example 4 | 1.632 | 0.288 | 15 | A | A-B |
| Example 5 | 0.0576 | 1.8624 | 15 | A-B | A |
| Comparative Example 1 | — | — | 15 | C | B |

It was found that the photo-alignment films of Examples 1 to 5 could be produced with a smaller light irradiation dose than that for the photo-alignment film of Comparative Example 1, and had improved light resistance. Furthermore, it was found that the photo-alignment films of Examples 1 to 3 had improved light resistance more than that of the photo-alignment film of Example 4, and had improved alignability more than that of the photo-alignment film of Example 5.

What is claimed is:

1. A composition for a photo-alignment film comprising:
   a compound expressed by the following general formula (I); and
   a compound expressed by the following general formula (II):

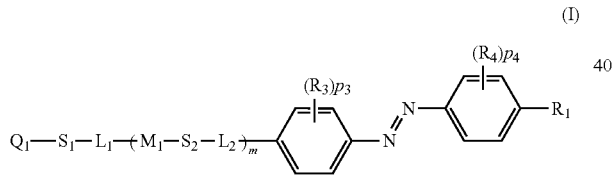
(I)

where in the above general formula (I), $R_1$ is any of a hydrogen atom, a cyano group, —F, —Cl, —Br, an alkyl group, an alkoxy group, —N(CH$_3$)$_2$, an alkylester group, and a group expressed by the following general formula (1); $L_1$ and $L_2$ are identical to or different from each other and are each independently any one selected from the group consisting of a single bond, —O—, —O—CO—, —O—CO—O—, —CO—O—, —S—, —N(CH$_3$)—, —NH—, —N(CH$_3$)—CO—, —NH—CO—, —CO—N(CH$_3$)—, and —CO—NH—; $S_1$ and $S_2$ are identical to or different from each other and are each independently one of a single bond and an optionally substituted alkylene group; $Q_1$ is a polymerizable group; $M_1$ is a group expressed by any of the following general formulae (2) to (8); $R_3$ and $R_4$ are identical to or different from each other and are each independently any one selected from the group consisting of —F, —Cl, —Br, —CH$_3$, —OCH$_3$, and —CN; $P_3$ and $P_4$ are identical to or different from each other and are each independently an integer of 0 to 4; and m is an integer of 0 to 3,

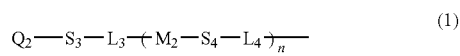
(1)

where in the above general formula (1), $L_3$ and $L_4$ are identical to or different from each other and are each independently any one selected from the group consisting of a single bond, —O—, —O—CO—, —O—CO—O—, —CO—O—, —S—, N(CH$_3$)—, —NH—, —N(CH$_3$)—CO—, —NH—CO—, —CO—N(CH$_3$)—, and —CO—NH—; $S_3$ and $S_4$ are identical to or different from each other and are each independently one of a single bond and an optionally substituted alkylene group; $Q_2$ is a polymerizable group; $M_2$ is identical to or different from the $M_1$ and is a group expressed by any of the following general formulae (2) to (8; and n is an integer of 0 to 3,

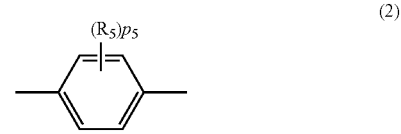
(2)

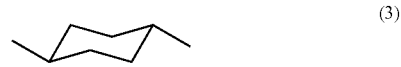
(3)

(4)

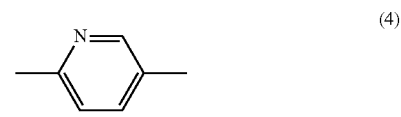
(5)

(6)

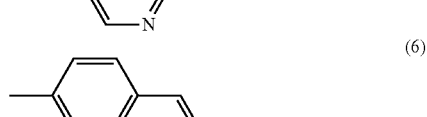
(7)

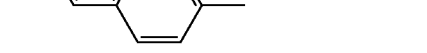

-continued

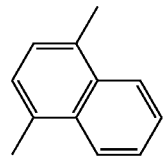
(8)

where in the above general formula (2), $R_5$ is any of —F, —Cl, —Br, —CH$_3$, —OCH$_3$, and —CN; and $P_5$ is an integer of 0 to 4,

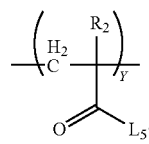
(II)

where in the above general formula (II), $R_2$ is one of a hydrogen atom and a methyl group; $L_5$ is any of a single bond, —O—, —NH—, and —N(CH$_3$)—; $L_6$ and $L_7$ are identical to or different from each other and are each independently any one selected from the group consisting of a single bond, —O—, —O—CO—, —O—CO—O—, —CO—O—, —S—, —N(CH$_3$)—, —NH—, —N(CH$_3$)—CO—, —NH—CO—, —CO—N(CH$_3$)—, and —CO—NH—; $S_5$ and $S_6$ are identical to or different from each other and are each independently one of a single bond and an optionally substituted alkylene group; $Q_3$ is a polymerizable group; $M_3$ is identical to or different from one of the $M_1$ and the $M_2$, and is a group expressed by any of the above general formulae (2) to (8); x is an integer of 1 to 5; and a parenthesis ( )$_Y$ indicates a repeating unit wherein the compound expressed by formula (II) has a weight average molecular weight of 2,000 or more.

2. The composition for a photo-alignment film according to claim 1, wherein at least one of $Q_1$, $Q_2$, and $Q_3$ is an oxetane group.

3. The composition for a photo-alignment film according to claim 1, further comprising a polymerization initiator.

4. A photo-alignment film comprising:
a film made from a composition for a photo-alignment film, wherein the composition for a photo-alignment film comprises:
a compound expressed by the following general formula (I); and
a compound expressed by the following general formula (II):

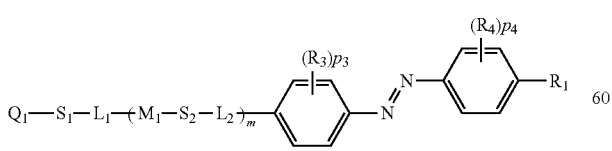
(I)

where in the above general formula (I), $R_1$ is any of a hydrogen atom, a cyano group, —F, —Cl, —Br, an alkyl group, an alkoxy group, —N(CH$_3$)$_2$, an alkylester group, and a group expressed by the following general formula (1); $L_1$ and $L_2$ are identical to or different from each other and are each independently any one selected from the group consisting of a single bond, —O—, —O—CO—, —O—CO—O—, —CO—O—, —S—, —N(CH$_3$)—, —NH—, —N(CH$_3$)—CO—, —NH—CO—, —CO—N(CH$_3$)—, and —CO—NH—; an $S_1$ and $S_2$ are identical to or different from each other and are each independently one of a single bond and an optionally substituted alkylene group; $Q_1$ is a polymerizable group; $M_1$ is a group expressed by any of the following general formulae (2) to (8); $R_3$ and $R_4$ are identical to or different from each other and are each independently any one selected from the group consisting of —F, —Cl, —Br, —CH$_3$, —OCH$_3$, and —CN; $P_3$ and $P_4$ are identical to or different from each other and are each independently an integer of 0 to 4; and m is an integer of 0 to 3,

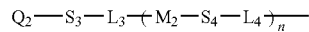
(1)

where in the above general formula (1), $L_3$ and $L_4$ are identical to or different from each other and are each independently any one selected from the group consisting of a single bond, —O—, —O—CO—, —O—CO—O—, —CO—O—, —S—, —N(CH$_3$)—, —NH—, —N(CH$_3$)—CO—, —NH—CO—, —CO—N(CH$_3$)—, and —CO—NH—; $S_3$ and $S_4$ are identical to or different from each other and are each independently one of a single bond and an optionally substituted alkylene group; $Q_2$ is a polymerizable group; $M_2$ is identical to or different from the $M_1$ and is a group expressed by any of the following general formulae (2) to (8); and n is an integer of 0 to 3,

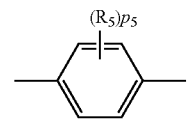
(2)

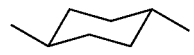
(3)

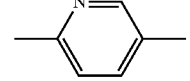
(4)

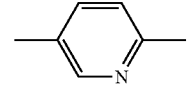
(5)

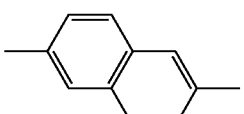
(6)

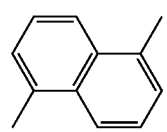
(7)

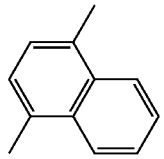
(8)

where in the above general formula (2), $R_5$ is any of —F, —Cl, —Br, —CH$_3$, —OCH$_3$, and —CN; and $P_5$ is an integer of 0 to 4,

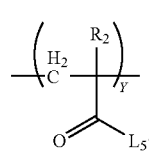
(II)

where in the above general formula (II), $R_2$ is one of a hydrogen atom and a methyl group, $L_5$ is any of a single bond, —O—, —NH—, and —N(CH$_3$)—; $L_6$ and $L_7$ are identical to or different from each other and are each independently any one selected from the group consisting of a single bond, —O—, —O—CO—, —O—CO—O—, —CO—O—, —S—, —N(CH$_3$)—, —NH—, —N(CH$_3$)—CO—, —NH—CO—, —CO—N(CH$_3$)—, and —CO—NH—; $S_5$ and $S_6$ are identical to or different from each other and are each independently one of a single bond and an optionally substituted alkylene group; $Q_3$ is a polymerizable group; $M_3$ is identical to or different from one of the $M_1$ and the $M_2$, and is a group expressed by any of the above general formulae (2) to (8); x is an integer of 1 to 5; and a parenthesis ( )$_Y$ indicates a repeating unit wherein the compound expressed by formula (II) has a weight average molecular weight of 2,000 or more.

5. A method for producing a photo-alignment film, comprising:
coating a surface of a support with a composition for a photo-alignment film; and
irradiating a coating of the composition for a photo-alignment film with polarized light from any direction or unpolarized light from an oblique direction relative to a coating surface, as a first light irradiation step,
wherein the composition for a photo-alignment film comprises:
a compound expressed by the following general formula (I); and
a compound expressed by the following general formula (II):

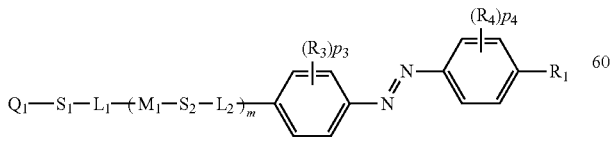
(I)

where in the above general formula (I), $R_1$ is any of a hydrogen atom, a cyano group, —F, —Cl, —Br, an alkyl group, an alkoxy group, —N(CH$_3$)$_2$, an alkylester group, and a group expressed by the following general formula (1); $L_1$ and $L_2$ are identical to or different from each other and are each independently any one selected from the group consisting of a single bond, —O—, —O—CO—, —O—CO—O—, —CO—O—, —S—, —N(CH$_3$)—, —NH—, —N(CH$_3$)—CO—, —NH—CO—, —CO—N(CH$_3$)—, and —CO—NH—; $S_1$ and $S_2$ are identical to or different from each other and are each independently one of a single bond and an optionally substituted alkylene group; $Q_1$ is a polymerizable group; $M_1$ is a group expressed by any of the following general formulae (2) to (8); $R_3$ and $R_4$ are identical to or different from each other and are each independently any one selected from the group consisting of —F, —Cl, —Br, —CH$_3$, —OCH$_3$, and —CN; $P_3$ and $P_4$ are identical to or different from each other and are each independently an integer of 0 to 4; and m is an integer of 0 to 3,

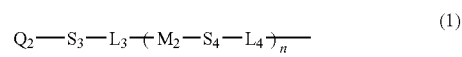
(1)

where in the above general formula (1), $L_3$ and $L_4$ are identical to or different from each other and are each independently any one selected from the group consisting of a single bond, —O—, —O—CO—, —O—CO—O—, —CO—O—, —S—, —N(CH$_3$)—, —NH—, —N(CH$_3$)—CO—, —NH—CO—, —CO—N(CH$_3$)—, and —CO—NH—; $S_3$ and $S_4$ are identical to or different from each other and are each independently one of a single bond and an optionally substituted alkylene group; $Q_2$ is a polymerizable group; $M_2$ is identical to or different from the $M_1$ and is a group expressed by any of the following general formulae (2) to (8); and n is an integer of 0 to 3,

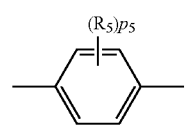
(2)

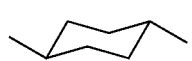
(3)

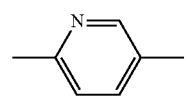
(4)

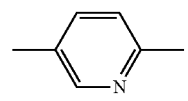
(5)

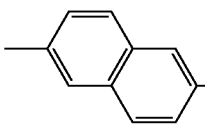
(6)

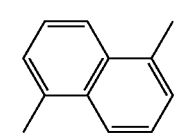
(7)

-continued

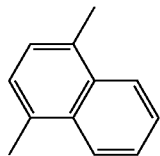
(8)

where in the above general formula (2), $R_5$ is any of —F, —Cl, —Br, —CH$_3$, —OCH$_3$, and —CN; and $P_5$ is an integer of 0 to 4,

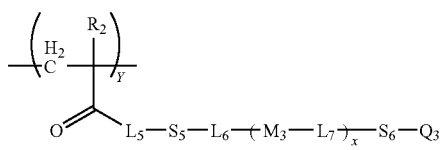
(II)

where in the above general formula (II), $R_2$ is one of a hydrogen atom and a methyl group; $L_5$ is any of a single bond, —O—, —NH—, and —N(CH$_3$)—; $L_6$ and $L_7$ are identical to or different from each other and are each independently any one selected from the group consisting of a single bond, —O—, —O—CO—, —O—CO—O—, —CO—O—, —S—, —N(CH$_3$)—, —NH—, —N(CH$_3$)—CO—, —NH—CO—, —CO—N(CH$_3$)—, and —CO—NH—; $S_5$ and $S_6$ are identical to or different from each other and are each independently one of a single bond and an optionally substituted alkylene group; $Q_3$ is a polymerizable group; $M_3$ is identical to or different from one of the $M_1$ and the $M_2$, and is a group expressed by any of the above general formulae (2) to (8); x is an integer of 1 to 5; and a parenthesis ( )$_Y$ indicates a repeating unit wherein the compound expressed by formula (II) has a weight average molecular weight of 2,000 or more.

6. The method for producing a photo-alignment film according to claim 5, wherein the polarized light or unpolarized light irradiated in the first light irradiation step has a wave of 365 nm and a cumulative dose of 1 mJ/cm$^2$ to 20 mJ/cm$^2$.

7. The method for producing a photo-alignment film according to claim 5, further comprising heating the composition for a photo-alignment film after the first light irradiation step, as a heating step.

8. The method for producing a photo-alignment film according to claim 7, a heating temperature in the heating step is 50° C. to 240° C.

9. The method for producing a photo-alignment film according to claim 5, further comprising irradiating the coating of the composition for a photo-alignment film with unpolarized light from a normal direction relative to the coating surface after the first light irradiation step, as a second light irradiation step.

* * * * *